Patented Apr. 21, 1942

2,280,484

UNITED STATES PATENT OFFICE 2,280,484

RECLAIMING OF RUBBER

Walter Gumlich, Leverkusen-Schlebusch, Germany, assignor, by mesne assignments, to General Aniline & Film Corporation, New York, N. Y., a corporation of Delaware No Drawing. Application January 28, 1939, Serial No. 253,352. In Germany January 29, 1938

4 Claims. (Cl. 260—720)

The present invention relates to improvements in the reclaiming of rubber from vulcanized products. In practice, natural rubber is reclaimed from its vulcanizates for instance by heating the same with a relatively high concentrated caustic soda solution or with the solution of a mineral acid. Moreover, the heating can be effected in the presence of an indifferent high boiling solvent such as tetrahydronaphthalene. These processes generally require the application of high temperatures of about 180° C., the heating being continued for a prolonged time, say about 5 to 15 hours. Whereas processes of the character described are practically used for the reclaiming of natural rubber from its vulcanizates, there is still a lack of suitable reclaiming processes for synthetic rubber-like materials which are obtained by the polymerization of butadienes or co-polymerization of butadienes and other polymerizable compounds.

It is the object of the present invention to develop a new process which allows one to effect the reclaiming of rubber from its vulcanizates at a lower temperature and more quickly than it was hitherto possible. Another object of my invention resides in the developing of auxiliary agents which are suitable for the reclaiming of natural rubber as well as of synthetic rubber-like materials of the character described. Other objects will be apparent from the following description and claims:

I have found that rubber (either natural or synthetic) can be reclaimed from its vulcanizates by incorporating therewith products of the condensation of mono-aryl hydrazines and aldehydes or ketones and heating the mixtures to a temperature for instance above about 100° C. I prefer to work between about 110–160° C., more particularly at about 130° C. At any rate, the presence of the auxiliary agents of the character described effects that the reclaiming process is carried out at a lower temperature and more quickly, viz. within about 1–4 hours, i. e. under milder conditions, than it was possible according to the hitherto known processes.

The auxiliary agents described above may also be defined as "hydrazones." As monoarylhydrazine there is preferably employed phenyl hydrazine, nitrophenyl hydrazine and other substitution products; as aldehydes or ketones there may be employed benzaldehyde, p-hydroxy benzaldehyde, diethylamino benzaldehyde, furfurol acetone, acetophenone, benzophenone and substitution products of the same. As a matter of fact the hydrazones must be so chosen that the softening point is not materially above the working temperature so that a homogenous distribution of the auxiliary agent within the rubber is secured. Moreover, the hydrazones must be free from groups inducing solubility in water as such groups would prevent the interpenetration. Moreover, also mixtures of several hydrazones can be employed.

The auxiliary agents of the character described can be incorporated within the vulcanizates in various ways, for instance, in a kneading machine, if desired with the addition of agents exerting a certain softening effect and facilitating a complete interpenetration of the rubber and the said auxiliary agents. As examples there may be mentioned: paraffine, colophony or stearic acid.

As examples for synthetic rubber-like materials which can be reclaimed from their vulcanizates there may be mentioned polymeric butadienes such as polymeric butadiene-1.3, or isoprene and co-polymerizates of such butadienes and other polymerizable compounds such as styrene.

In general, about 3–8% of the said auxiliary agents are sufficient to exert the desired effect, the optimum amount depending in each case on the degree of vulcanization of the rubber. I prefer to work with about 5% of the auxiliary agents.

The following examples illustrate the present invention without, however, restricting it thereto, the parts being by weight:

*Example 1*

Within 100 parts of finely ground vulcanizate of natural rubber there are incorporated on the kneader 5 parts of benzaldehyde phenyl hydrazone. The mixture is then heated with hot air to about 130° for 1–2 hours under 3 atmospheres pressure. After a 3 times feeding through a refiner a coherent soft, adhesive and smooth sheet is obtained which can easily be worked up into rubber mixtures.

*Example 2*

Within 100 parts of a finely ground vulcanizate of natural rubber there is incorporated on the kneader a solution of 5 parts of p-hydroxy benzaldehyde phenyl hydrazone (dissolved in a mixture of acetone and chloroform). Thereupon a stream of hot air (130° C.) is passed therethrough at 3 atmospheres pressure. Also in this case a reclaimed rubber of good mechanical properties is obtained.

With a similar effect there can be employed equal amounts of the phenyl hydrazone of diethylaminobenzaldehyde, acetophenone, benzophenone or the nitrophenyl hydrazone of acetone or mixtures of different phenylhydrazones, particularly those containing the benzaldehyde phenyl hydrazone.

*Example 3*

100 parts of a finely ground vulcanizate of a synthetic rubber being the product of the conjoint polymerization of 75 parts of butadiene and 25 parts of styrene are mixed with 5-10 parts of a mixture of benzaidehyde phenyl hydrazone, colophonium, paraffine and stearic acid (in the proportion of about 4:1:1:1). The mixture is then treated with a stream of hot air (about 130°) at 3.0 atmospheres pressure. By a short treating on the refiner a regenerate of good mechanical properties is obtained.

I claim:

1. The reclaiming of vulcanized rubber scrap by heating the same in the presence of a condensation product of a monoaryl hydrazine and a member of the group consisting of aldehydes and ketones at a temperature of about 100–160° C.

2. The process as claimed in claim 1 wherein the heating is effected at a temperature between about 110 and about 160° C.

3. The process which comprises heating a rubber vulcanizate in the presence of benzaldehydephenyl hydrazone at a temperature of about 100–160° C.

4. The process which comprises heating a rubber vulcanizate in the presence of benzaldehydephenyl hydrazone at 110–160° C.

WALTER GUMLICH.